(12) United States Patent
Kimura et al.

(10) Patent No.: US 10,240,808 B2
(45) Date of Patent: Mar. 26, 2019

(54) INDUCED AIR DISCHARGING UNIT

(71) Applicant: Kimura Kohki Co., Ltd, Osaka-shi, Osaka (JP)

(72) Inventors: Keiichi Kimura, Yao (JP); Mitsuo Morita, Nabari (JP); Katsuhiro Urano, Sakai (JP)

(73) Assignee: Kimura Kohki Co., Ltd., Osaka-shi, Osaka (JP)

( * ) Notice: Subject to any disclaimer, the term of this patent is extended or adjusted under 35 U.S.C. 154(b) by 0 days.

(21) Appl. No.: 15/687,200

(22) Filed: Aug. 25, 2017

(65) Prior Publication Data

US 2018/0058707 A1 Mar. 1, 2018

(30) Foreign Application Priority Data

Aug. 26, 2016 (JP) .................................. 2016-165396

(51) Int. Cl.
*F24F 1/01* (2011.01)
*F24F 3/16* (2006.01)
*F24F 13/08* (2006.01)

(52) U.S. Cl.
CPC .............. *F24F 3/1603* (2013.01); *F24F 1/01* (2013.01); *F24F 3/166* (2013.01); *F24F 13/082* (2013.01); *F24F 2003/1667* (2013.01); *F24F 2003/1682* (2013.01); *F24F 2003/1689* (2013.01)

(58) Field of Classification Search
CPC ....... F24F 1/01; F24F 3/166; F24F 2003/1682
See application file for complete search history.

(56) References Cited

U.S. PATENT DOCUMENTS

| 3,424,233 | A | * | 1/1969 | Meckler | .............. | F21V 33/0088 |
| | | | | | | 165/48.1 |
| 2004/0145853 | A1 | | 7/2004 | Sekoguchi et al. | | |
| 2010/0242726 | A1 | * | 9/2010 | Enbom | ..................... | F24F 1/01 |
| | | | | | | 95/58 |

FOREIGN PATENT DOCUMENTS

| EP | 1 559 964 A1 | 8/2005 |
| EP | 1 852 659 A1 | 11/2007 |
| EP | 2 244 021 A2 | 10/2010 |
| FR | 2 262 876 A1 | 9/1975 |
| JP | 54-136853 | 10/1979 |
| JP | 2-13934 | 1/1990 |

(Continued)

OTHER PUBLICATIONS

Extended European Search Report for European Patent Application No. 17186554.6, dated Jan. 18, 2018.

*Primary Examiner* — Eric Ruppert
(74) *Attorney, Agent, or Firm* — Marshall, Gerstein & Borun LLP

(57) ABSTRACT

An induced air discharging unit includes: a jet flow generator configured to discharge supply air fed from outside, the jet flow generator discharging the supply air as a jet flow of air; an air inducer configured to allow air of an air-conditioning target space to be induced by an inducing effect of the jet flow of air discharged from the jet flow generator; an air mixer configured to discharge mixed air of the jet flow of air from the jet flow generator and the air induced by the air inducer to the air-conditioning target space, and radiate heat of the mixed air to the air-conditioning target space; and an air purifier configured to produce a purifying substance that purifies a purification target substance by chemical reaction, and blow out the purifying substance to the air-conditioning target space.

4 Claims, 4 Drawing Sheets

(56) References Cited

FOREIGN PATENT DOCUMENTS

| JP | 3094164 U | 6/2003 |
|---|---|---|
| JP | 2005-069515 A | 3/2005 |
| JP | 2011021808 A | 2/2011 |
| JP | 2013-104599 A | 5/2013 |
| JP | 2015-081721 A | 4/2015 |
| WO | WO-2008/119893 A1 | 10/2008 |
| WO | WO-2012/068569 A1 | 5/2012 |

* cited by examiner

INDUCED AIR DISCHARGING UNIT

BACKGROUND OF THE INVENTION

Field of the Invention

The present invention relates to an induced air discharging unit that discharges a jet flow of air and air induced by the jet flow of air to an air-conditioning target space.

Description of the Related Art

For example, Japanese Laid-Open Patent Application Publication No. 2011-21808 discloses an induced air discharging unit that discharges a jet flow of air and air induced by the jet flow of air to an air-conditioning target space (i.e., a space to be air-conditioned). The induced air discharging unit is used in a building structure, the interior of which is provided with a ceiling and is divided by the ceiling into the air-conditioning target space and an accommodating space. The induced air discharging unit is disposed in the accommodating space. The induced air discharging unit includes: an air feeder configured to discharge supply air fed from the outside of the building structure, the air feeder discharging the supply air as a jet flow of air; an air inducer configured to draw in (i.e., induce) the air of the air-conditioning target space by an inducing effect of the jet flow of air discharged from the air feeder; and an air mixer configured to discharge mixed air of the jet flow of air from the air feeder and the air induced by the air inducer to the air-conditioning target space, and radiate the heat of the mixed air to the air-conditioning target space. By means of the thermal radiation of the mixed air and thermal transfer by the air mixer, comfortable air conditioning with no temperature irregularity can be realized, in which a user in the air-conditioning target space does not experience a drafty feeling (i.e., excessive coldness/warmness).

Such an induced air discharging unit is useful for creating a comfortable air-conditioned space. However, in recent years, there is a demand for a more comfortable air-conditioned space that is, for example, supplied with purified air.

An object of the present invention is to provide an induced air discharging unit that makes it possible to create an air-conditioned space with improved comfortability.

SUMMARY OF THE INVENTION

An induced air discharging unit according to one aspect of the present invention is used in a building structure that includes a partition wall and an air-conditioning target space formed inside the partition wall. The induced air discharging unit is disposed facing the partition wall. The induced air discharging unit includes: a jet flow generator configured to discharge supply air fed from outside of the building structure, the jet flow generator discharging the supply air as a jet flow of air; an air inducer configured to allow air of the air-conditioning target space to be induced by an inducing effect of the jet flow of air discharged from the jet flow generator; an air mixer configured to discharge mixed air of the jet flow of air from the jet flow generator and the air induced by the air inducer to the air-conditioning target space, and radiate heat of the mixed air to the air-conditioning target space; and an air purifier connected to the air mixer, the air purifier being configured to produce a purifying substance that purifies a purification target substance by chemical reaction, and blow out the purifying substance to the air-conditioning target space.

According to the configuration of the above aspect, clean air conditioning with no temperature irregularity can be realized, in which a user in the air-conditioning target space does not experience a drafty feeling (i.e., excessive coldness/warmness). Since the induced air discharging unit has both the function of making uniform the temperature of the air-conditioning target space and the air purifying function, additional installation of an expensive air purifying filter and/or air purifying device is not necessary. Therefore, the installation space and cost of such air purifying filter and/or air purifying device can be eliminated.

In another aspect of the present invention, the air purifier produces at least one purifying substance selected from the group consisting of ions and active species.

According to this configuration, the purifying substance can be caused to react with purification target substances, such as bacteria, viruses, fumes, odors, and allergens, contained in the air of the air-conditioning target space and harmful to the human body, and thereby an advantage of being able to neutralize the effects of the purification target substances is obtained.

In yet another aspect of the present invention, the air purifier includes: a production unit configured to bring air into a plasma state by electrical discharge to produce the purifying substance; and a blow-out part configured to blow out the purifying substance produced by the production unit to the air-conditioning target space by utilizing part of the mixed air of the air mixer.

According to this configuration, in the production unit, purification target substances such as fumes, dust, and particulate matter can be electrically charged and captured. Since the blow-out part blows out the purifying substance by utilizing part of the mixed air of the air mixer, a fan for forcibly bringing the purifying substance into contact with the purification target substances is not necessary. This makes it possible to reduce the overall size of the induced air discharging unit and lower its cost. Moreover, since the blow-out part blows out the part of the mixed air of the air mixer at high velocity, the purifying substance can be widely spread within a short period of time, and thereby the air purifying performance can be improved.

In yet another aspect of the present invention, the induced air discharging unit includes at least one selected from the group consisting of an illuminator configured to illuminate the air-conditioning target space, a sound generator configured to emit a sound to the air-conditioning target space, and an aroma generator configured to emit an aroma to the air-conditioning target space.

According to the above configuration, the therapeutic effect of the color of the light of the illuminator, the therapeutic effect of sound waves from the sound generator, and/or the aroma-therapeutic effect of the aroma from the aroma generator can be obtained.

DETAILED DESCRIPTION

Figure 7:
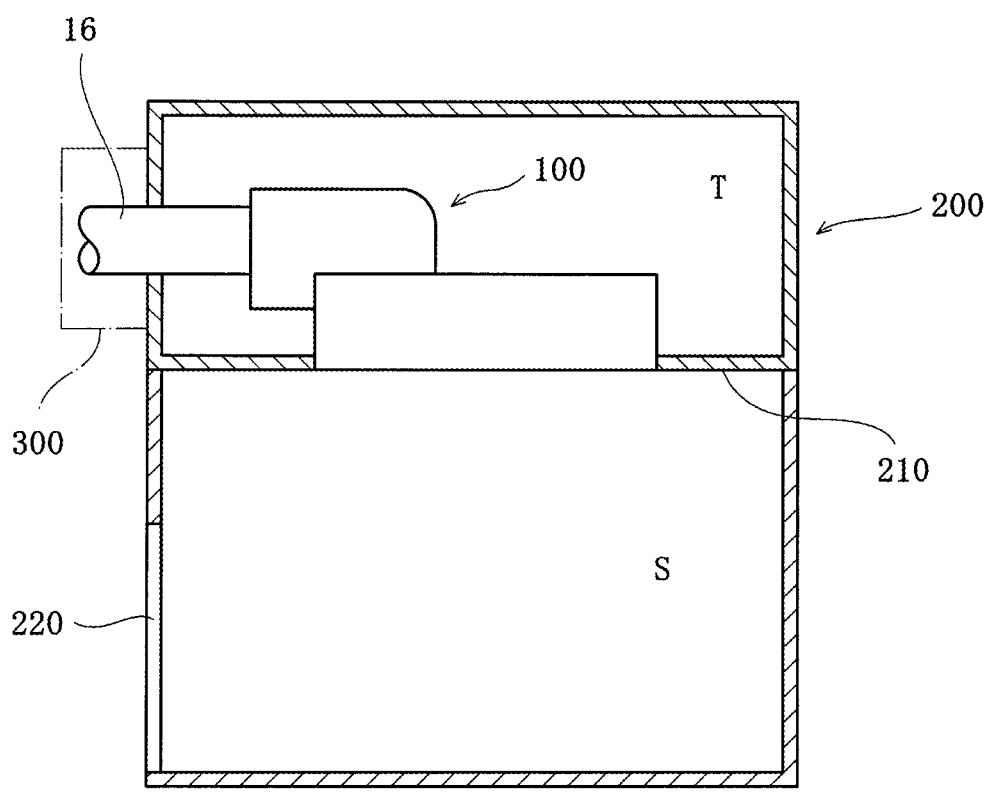
FIG. 7 is a schematic diagram of a building structure in which the induced air discharging unit is installed.

FIG. 7 is a schematic diagram of a building structure 200, in which an induced air discharging unit 100 according to the present invention is installed. The interior of the building structure 200 is provided with a partition wall 210, which serves as a ceiling, and the interior of the building structure 200 is divided by the partition wall 210 into an air-conditioning target space (a space to be air-conditioned) S and an accommodating space T. The induced air discharging unit 100 is disposed in the accommodating space T, such that the induced air discharging unit 100 faces the partition wall 210. The induced air discharging unit 100 supplies air to the air-conditioning target space S through the partition wall 210. A user of the building structure 200 can enter/exit the air-conditioning target space S by opening and closing a door 220. An air conditioner 300 configured to supply high-temperature or low-temperature air is provided outside the accommodating space T.

Embodiment 1

Figure 1:
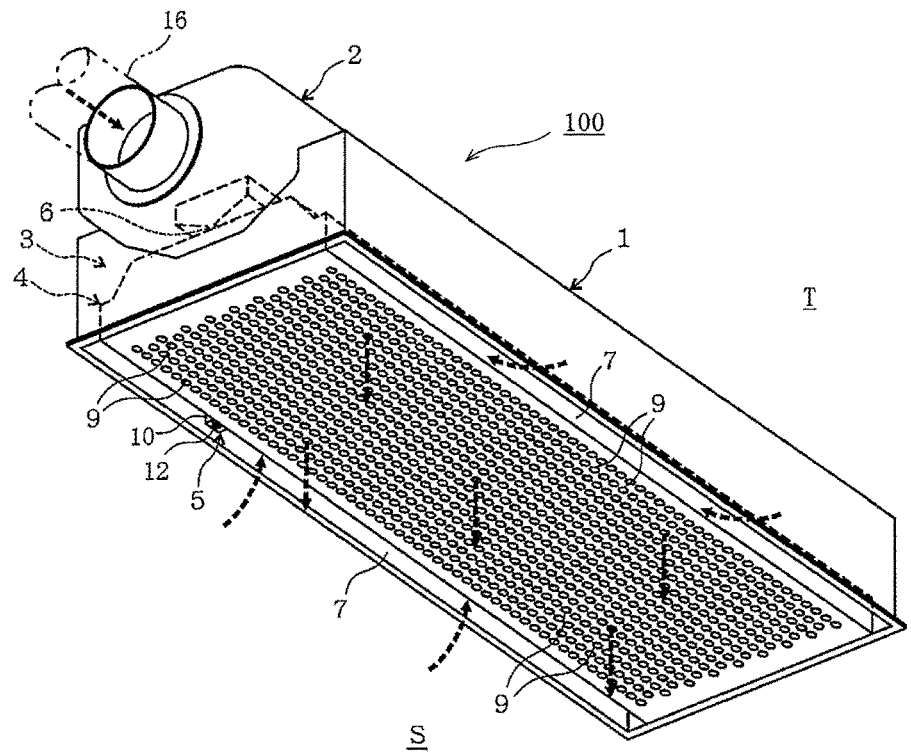
FIG. 1 is a perspective view of an induced air discharging unit of the present invention as seen from below.
Figure 2:
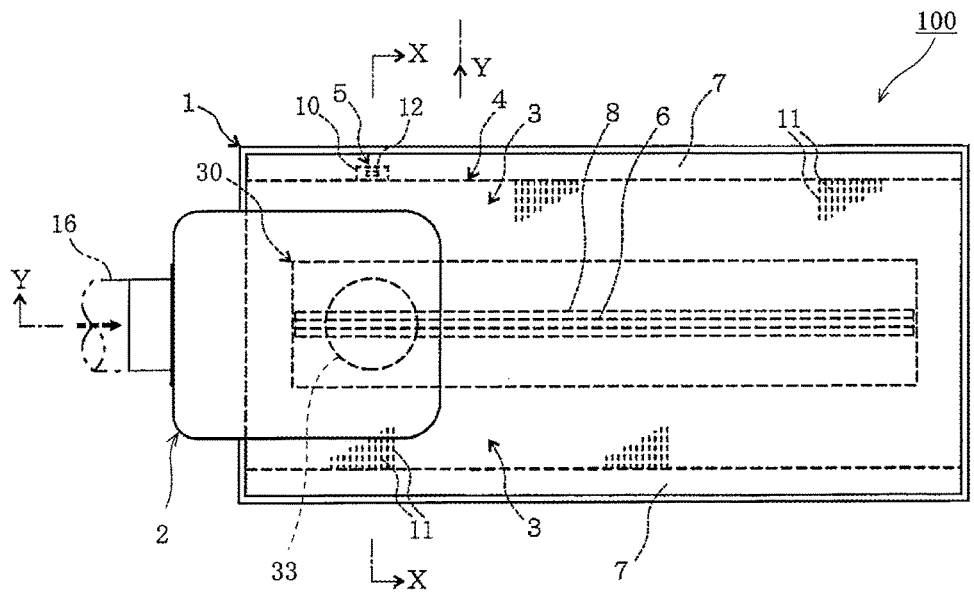
FIG. 2 is a plan view of the induced air discharging unit of FIG. 1.
Figure 3:
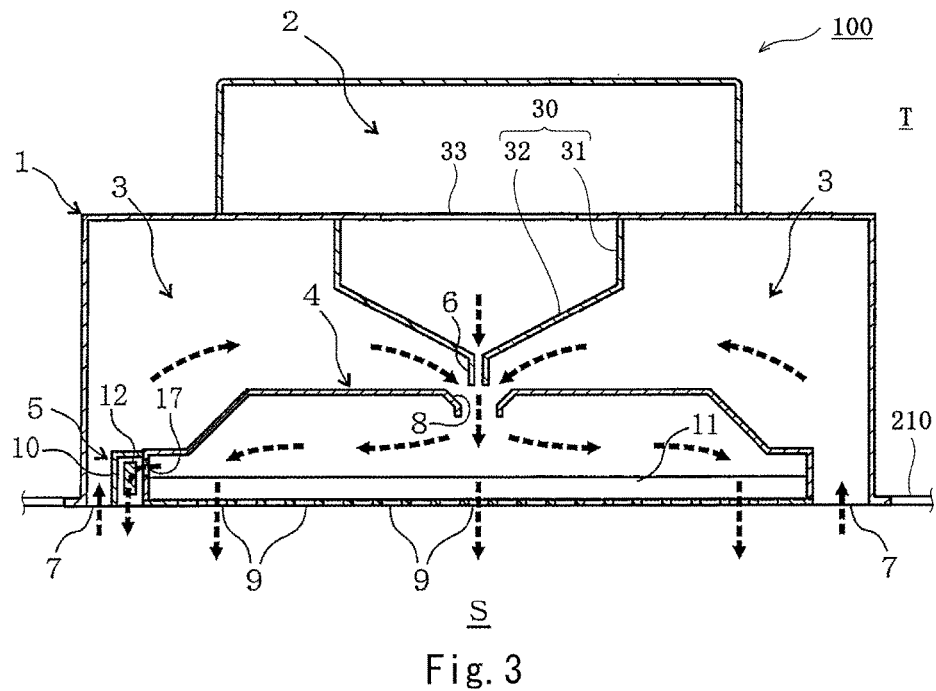
FIG. 3 is a cutaway sectional view of the induced air discharging unit of FIG. 2, the view being taken along a line X-X of FIG. 2 as seen in the direction of the arrows of the line X-X.
Figure 4:
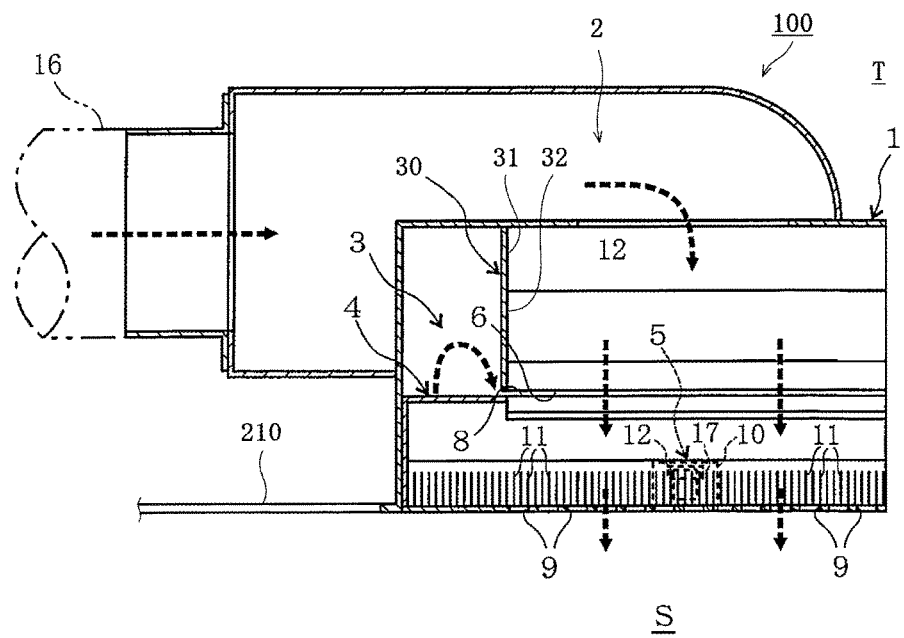
FIG. 4 is a cutaway sectional view of the induced air discharging unit of FIG. 2, the view being taken along a line Y-Y of FIG. 2 as seen in the direction of the arrows of the line Y-Y.

Each of FIG. 1 to FIG. 4 shows the induced air discharging unit 100. FIG. 1 is a perspective view of the induced air discharging unit 100. FIG. 2 is a plan view of the induced air discharging unit 100. FIG. 3 is a cutaway sectional view of the induced air discharging unit 100 of FIG. 2, the view being taken along a line X-X of FIG. 2 as seen in the direction of the arrows of the line X-X. FIG. 4 is a cutaway sectional view of the induced air discharging unit 100 of FIG. 2, the view being taken along a line Y-Y of FIG. 2 as seen in the direction of the arrows of the line Y-Y.

The induced air discharging unit 100 includes the following components inside a casing 1 disposed in the accommodating space T: an air feeder 2; an air inducer 3 configured to allow air to move between the air inducer 3 and the air-conditioning target space S; an air mixer 4; and an air purifier 5. In the drawings, arrows of bold dashed lines indicate directions in which air flows. The air feeder 2 is connected to the air conditioner 300 (see FIG. 7) via a duct 16. The air conditioner 300 supplies high-temperature or low-temperature air-conditioned air. The air feeder 2, the air inducer 3, and the air mixer 4 are sequentially arranged in the vertical direction in this order, such that the air feeder 2 is positioned at the top. The air feeder 2 is connected to a jet flow generator 30 disposed in the air inducer 3. The width of the jet flow generator 30 is narrowed at its lower end. A jet flow of air generated by the jet flow generator 30 is directed to the air mixer 4.

It is well known that, due to the effect of viscosity, a jet flow draws in (i.e., induces) the surrounding air. Accordingly, the jet flow of air induces the air of the air-conditioning target space S via the air inducer 3, which is configured to allow air to move between the air inducer 3 and the air-conditioning target space S. The jet flow of air and the air induced from the air-conditioning target space S are mixed together in the air mixer 4 and discharged from the air mixer 4 to the air-conditioning target space S. At the same time, the heat of the mixed air is radiated from the air mixer 4 to the air-conditioning target space S. If the air mixer 4 is made of a metal having a high thermal conductivity, a higher thermal radiation effect is obtained.

The jet flow generator 30 includes: a generator body 31, which extends from side to side with a top opening 33 formed in its upper surface, the top opening 33 facing the air feeder 2; a slope 32, which slopes downward and inward from the generator body 31; and a nozzle 6, which is positioned at the bottom of the slope 32 and which has a narrower width than that of the generator body 31. Air fed from the air feeder 2 through the top opening 33 is formed by the nozzle 6 into a jet flow of air directed to the air mixer 4.

The lower surface of the air inducer 3 is provided with a pair of inducing openings 7 connected to the air-conditioning target space S. Due to the aforementioned inducing effect of the jet flow of air, the air of the air-conditioning target space S is drawn into the air mixer 4 through the inducing openings 7.

The air mixer 4 includes: a suction opening 8 formed in the upper surface of the air mixer 4, the suction opening 8 extending from side to side; and a metal plate group 11 arranged at the bottom of the air mixer 4, such that metal plates 11 are vertical to a large number of discharge holes 9 formed in the lower surface of the air mixer 4. The aforementioned mixed air of the jet flow of air from the jet flow generator 30 and the induced air from the air inducer 3 is mixed in the air mixer 4, passes through the plate group 11, and is then discharged to the air-conditioning target space S through the discharge holes 9. At the same time, the heat of the mixed air is radiated to the air-conditioning target space S.

In other words, while passing through the plate group 11, the mixed air spreads out by being divided by the plates 11 into multiple flows, which are also straightened by the plates 11. Then, the flows of the mixed air are discharged to the air-conditioning target space S through the discharge holes 9. The heat of the mixed air is thermally transferred to the plate group 11 and then discharged to the air-conditioning target space S through the discharge holes 9. Preferably, the plate group 11 is formed in such a manner that plate members having a high thermal conductivity and a high thermal radiation rate, such as aluminum plates, are arranged at intervals.

The air purifier 5 produces a purifying substance that purifies purification target substances (i.e., substances to be purified) by chemical reaction. The air purifier 5 produces at least one purifying substance selected from the group consisting of positively and negatively charged ions and active species including hydroxyl radicals, superoxides, superoxide anions, and ozone. The produced purifying substance chemically reacts (e.g., by oxidation) with the purification target substances suspended in the air of the air-conditioning target space S, such as fumes, odors, bacteria, viruses, and allergens, thereby eliminating or inactivating them, i.e., neutralizing them. In this manner, the purification target substances are purified. It should be noted that the purifying substance is not limited to the above examples.

The air purifier 5 includes a production unit 12 in a blow-out part 10. The production unit 12 brings air into a plasma state by electrical discharge to produce the aforementioned purifying substance that renders the purification target substances electrically charged. Oxygen and water in the air are decomposed by the electrons in the plasma. As a result, for example, active species (such as ozone) and ions are produced. Examples of an electrical discharge method that can be adopted to bring the air into the plasma state include corona discharge, barrier discharge, creeping discharge, arc discharge, microwave discharge, and pulse discharge. The production unit 12 is configured as a plasma generator that adopts any of these electrical discharge methods.

The blow-out part 10 is provided adjacently to the air mixer 4, and configured to blow out the purifying substance to the air-conditioning target space S by utilizing part of the mixed air of the air mixer 4. The air mixer 4 includes a blow-out hole 17 formed therein, the blow-out hole 17 communicating with the blow-out part 10. The mixed air of the air mixer 4 increases its velocity when passing through the blow-out hole 17. The mixed air that has increased its velocity when passing through the blow-out hole 17 flows into the blow-out part 10, and is then blown out to the air-conditioning target space S together with the purifying substance produced by the production unit 12.

Embodiment 2

Figure 5:
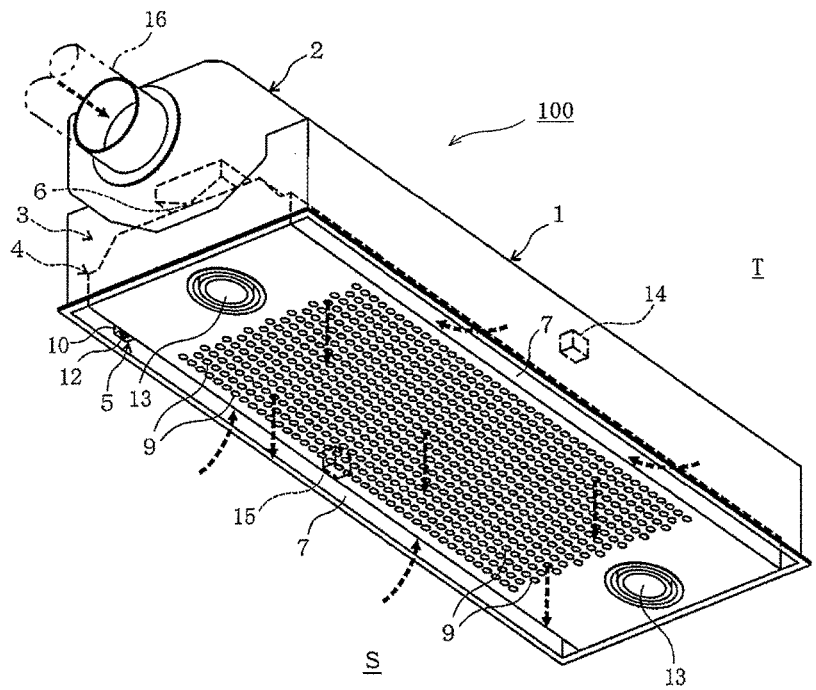
FIG. 5 is a perspective view of another induced air discharging unit as seen from below.
Figure 6:
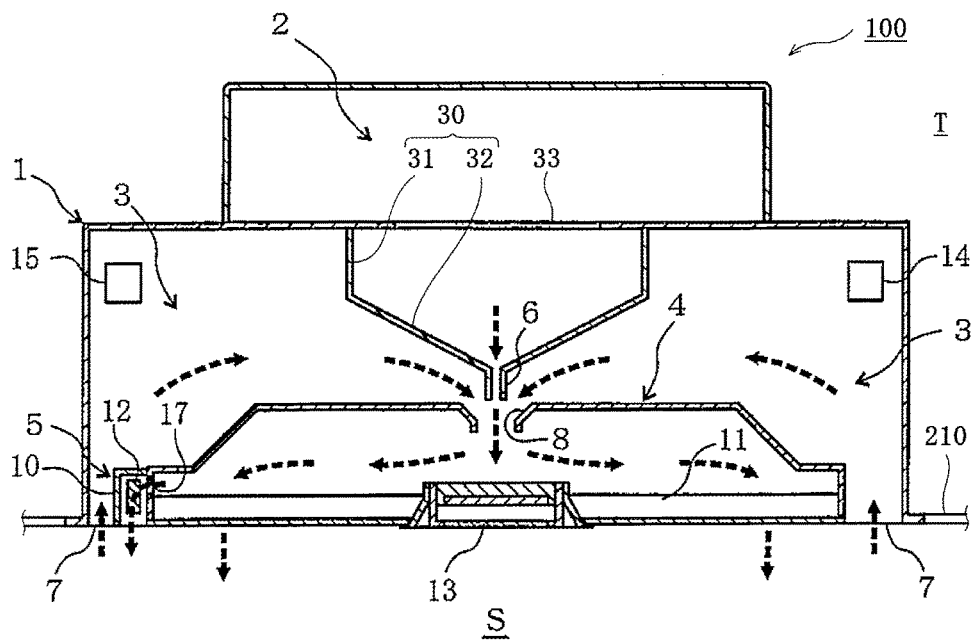
FIG. 6 is a schematic diagram showing an air-conditioning system.

As shown in FIG. 5 and FIG. 6, in the air inducer 3, all of or at least part of the following may be arranged: illuminators 13, such as downlights and linear lighting, configured to illuminate the air-conditioning target space S; a sound generator 14, such as a speaker unit, configured to emit a sound to the air-conditioning target space S; and an aroma generator 15 configured to emit an aroma to the air-conditioning target space S. The number of air purifiers 5 and the position(s) thereof are not limited to those shown in the drawings. Instead of the aforementioned electrical discharge method, the production unit 12 may utilize a photocatalyst, ultraviolet light, or radiation to produce the purifying substance.

In the above-described embodiment, the interior of the building structure 200 is divided by the partition wall 210, which serves as the ceiling, into the air-conditioning target space S and the accommodating space T. However, as an alternative, the building structure 200 may include the partition wall 210 and the air-conditioning target space S without the accommodating space T. In this case, it is conceivable to suspend the induced air discharging unit 100 from the partition wall 210, such that the induced air discharging unit 100 is disposed facing the partition wall 210.

In the above description, the partition wall 210 serves as the ceiling. However, as an alternative, the partition wall 210 may be a side wall, or may be a diagonal wall positioned between the ceiling and a side wall.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF THE REFERENCE CHARACTERS 2 air feeder
3 air inducer
4 air mixer
5 air purifier
10 blow-out part
12 production unit
30 jet flow generator
100 induced air discharging unit

What is claimed is:

1. An induced air discharging unit used in a building structure that includes a partition wall and an air-conditioning target space formed inside the partition wall, the induced air discharging unit being disposed facing the partition wall, the induced air discharging unit comprising:
a jet flow generator configured to discharge supply air fed from outside of the building structure, the jet flow generator discharging the supply air as a jet flow of air;
an air inducer configured to allow air of the air-conditioning target space to be induced by an inducing effect of the jet flow of air discharged from the jet flow generator;
an air mixer configured to discharge mixed air of the jet flow of air from the jet flow generator and the air induced by the air inducer to the air-conditioning target space, and radiate heat of the mixed air to the air-conditioning target space; and
an air purifier connected to the air mixer, the air purifier being configured to produce a purifying substance that purifies a purification target substance by chemical reaction, and blow out the purifying substance to the air-conditioning target space;
wherein the air purifier includes a production unit configured to bring air into a plasma state by electrical discharge to produce the purifying substance,
the air purifier also includes a blow-out part configured to blow out the purifying substance produced by the production unit to the air-conditioning target space by utilizing part of the mixed air of the air mixer;
wherein the air mixer includes a blow-out hole communicating with the blow-out part, the mixed air that has increased its velocity when passing through the blow-out hole flows into the blow-out part, and is then blown out to the air-conditioning target space together with the purifying substance produced by the production unit.

2. The induced air discharging unit according to claim 1, wherein the air purifier produces at least one purifying substance selected from the group consisting of ions and active species.

3. The induced air discharging unit according to claim 1, comprising at least one selected from the group consisting of an illuminator configured to illuminate the air-conditioning target space, a sound generator configured to emit a sound to the air-conditioning target space, and an aroma generator configured to emit an aroma to the air-conditioning target space.

4. The induced air discharging unit according to claim 2, comprising at least one selected from the group consisting of an illuminator configured to illuminate the air-conditioning target space, a sound generator configured to emit a sound to the air-conditioning target space, and an aroma generator configured to emit an aroma to the air-conditioning target space.

* * * * *